United States Patent Office 3,462,838
Patented Aug. 26, 1969

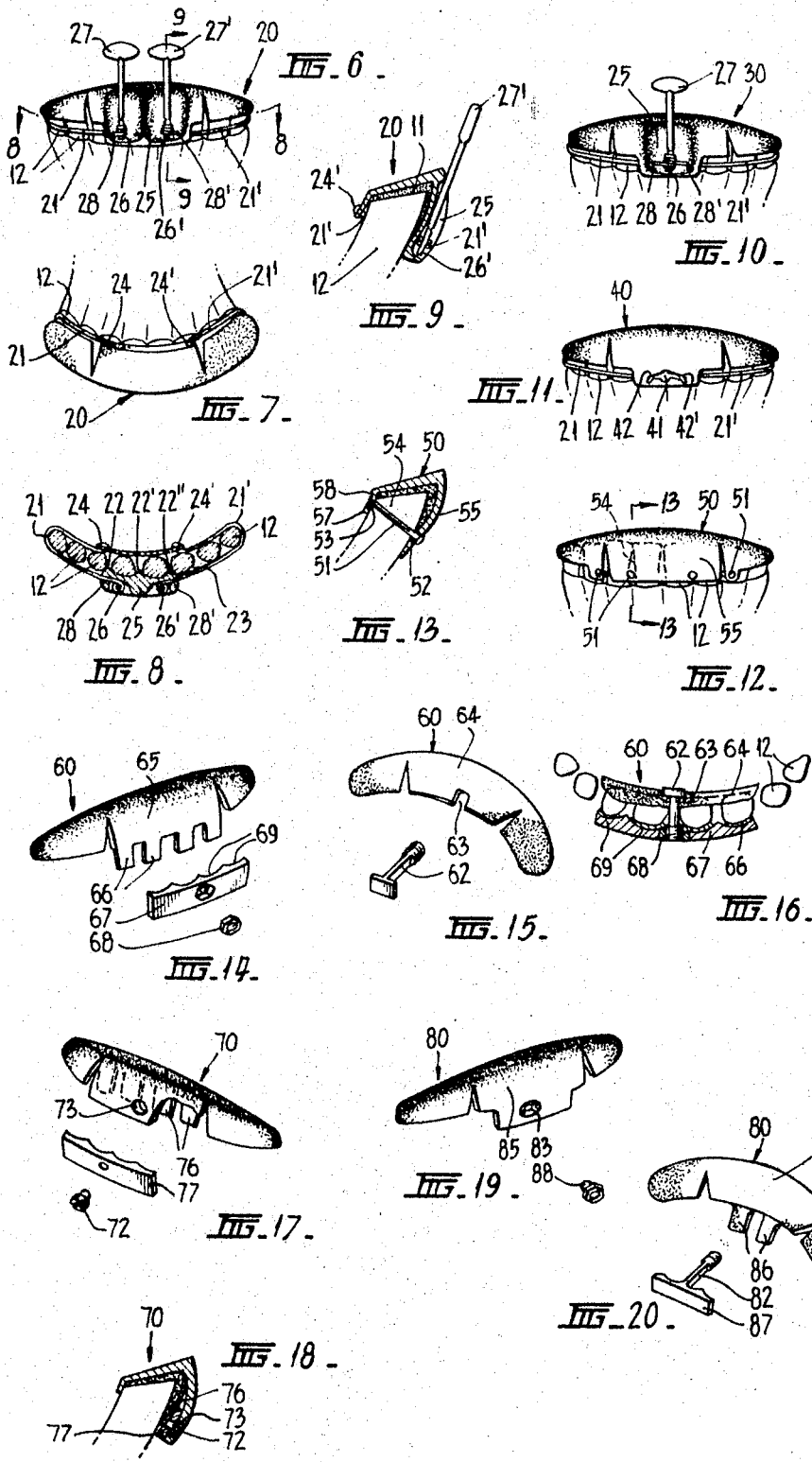

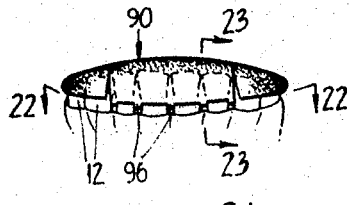 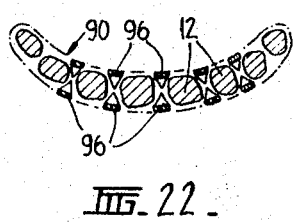 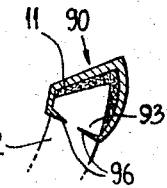 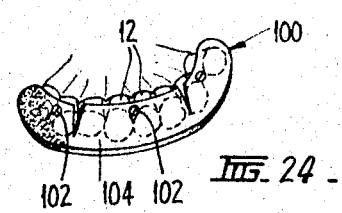 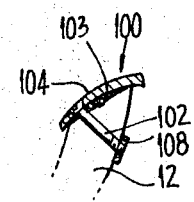 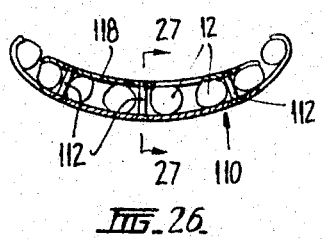 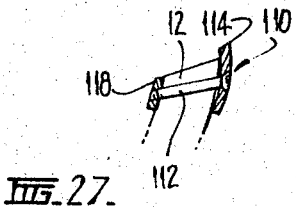 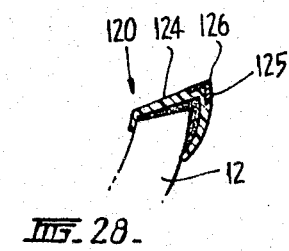 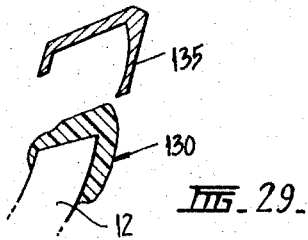

3,462,838
PROSTHETIC DEVICE FOR ANIMAL TEETH
Martin Robert MacDonald Alstergren, 11 Millicent Ave., Toorak, Victoria, Australia
Filed Mar. 23, 1967, Ser. No. 625,340
Claims priority, application Australia, Mar. 25, 1966, 3,440/66; Sept. 12, 1966, 10,922/66
Int. Cl. A61c 13/22
U.S. Cl. 32—12                                 9 Claims

ABSTRACT OF THE DISCLOSURE

A prosthetic device for animal teeth which can assist or replace the action of any defective or missing teeth, comprising at least one curved member extending over a distance corresponding to a plurality of teeth, said member having a hollow underside part of its surface formed for engagement with and over a plurality of said teeth for fixture thereto and having an outer part of its surface formed as a biting surface on or near an apex of the member, wherein said member is formed in the shape of a crescent having an inwardly curved upper surface and an outwardly curved frontal surface, said curved surfaces meeting at an acute angle to provide a ridge along said biting surface and having a mechanical positioning and securing attachment for initially securing the device in position until permanent fixing is effected by a hard setting cement which is applied between the teeth and the device.

---

This invention relates to a prosthetic device for animal teeth, and in particular, to a prosthetic device which can assist or replace the action of any defective or missing teeth which would cause an animal difficulty in feeding and loss of condition, or which otherwise would result in deterioration of the animal.

Although the invention has general application to animals, it is particularly advantageous when applied to sheep kept for breeding.

It is known that the teeth of sheep begin to deteriorate when aged from about four to six years. Sheep of these ages having defective teeth must be culled, even though their breeding life otherwise possible could be doubled. The economic loss is greater than this factor however, since the ewe is more effective in breeding as an aged ewe in the later period, than the earlier.

The feeding action of sheep is to grip a tuft of grass between the rear upper side of the front teeth in the lower jaw and the gum pad in the upper jaw and to detach the grass by pulling, so that a tearing of the grass takes place along the edge of the teeth rather than a purely incisive action.

Where some of the teeth are loose or missing, the grass will tend to slip away from the sheep in its feeding because of loss or absence of pressure between the teeth and the gum part. Furthermore, where the teeth are broken or worn, to the detriment of the edge line of the teeth, the effectiveness of the tearing action and the feeding of the sheep will be accordingly diminished.

It of course would be possible, although difficult, to fit artificial dentures to sheep. However, such a remedy is not acceptable in the economics of sheep breeding.

It is an object of the present invention to provide a prosthetic device for animal teeth which is simple and economical to apply to animals and which is particularly applicable to prolonging the useful breeding life of sheep.

It is a further object of the invention to consolidate the teeth of an animal having loose or broken teeth and to provide a new biting surface for the teeth.

It is a further object of the invention to provide a new biting surface for an animal having missing teeth.

It is a further object of the invention to prevent mouth disease in an animal which might originate from infection in the teeth.

It is a further object of the invention to restore the gripping action of worn teeth of an animal and to provide a new biting edge.

According to the invention there is provided a prosthetic device for animal teeth comprising at least one curved member extending in an arc over a distance corresponding to a plurality of teeth, said member having a hollow underside part of its surface formed for engagement with and over a plurality of said teeth for fixture thereto and having an outer part of its surface formed as a biting surface on or near an apex of the member.

In a preferred form of the invention said member is formed in the shape of a crescent having an inwardly curved upper surface and an outwardly curved frontal surface, said curved surfaces meeting at an acute angle to provide a ridge along said biting surface, said hollow surface is formed of a longitudinal cavity extending through the member beneath the outer biting surface, and at least one slit is provided in the member, said slit extending in a direction substantially along the radius of the curve from an edge of the member to enable the curvature of the member to be varied and thereby effect a closer fitting of the member to the teeth.

The foregoing and further objects and features of the invention and manner of performance will become apparent by reference to the following description of several embodiments of the invention as illustrated in the accompanying drawings wherein:

FIGURE 6 is a front elevation view of an embodiment of the prosthetic device incorporating a securing means;

FIGURE 7 is a plan view of the embodiment shown in FIGURE 6;

FIGURE 8 is a plan in cross-section view along line 8—8 of FIGURE 6;

FIGURE 9 is a side elevation in cross-section view along line 9—9 of FIGURE 6;

FIGURE 10 is a front elevation view of an embodiment of the prosthetic device incorporating a further securing means;

FIGURE 11 is a front elevation of an embodiment of the prosthetic device incorporating a further securing means;

FIGURE 12 is a front elevation of an embodiment of the prosthetic device incorporating a further securing means;

FIGURE 13 is a side elevation in cross-section view along line 13—13 of FIGURE 12;

FIGURE 14 is a front perspective view of an embodiment of the prosthetic device incorporating a further securing means;

FIGURE 15 is a rear perspective view of the prosthetic device shown in FIGURE 14;

FIGURE 16 is a plan in full cross-section view of the prosthetic device shown in FIGURES 14 and 15;

FIGURE 17 is a front perspective view of an embodiment of the prosthetic device incorporating a further securing means;

FIGURE 18 is a side elevation in full cross-section view of the prosthetic device shown in FIGURE 17;

FIGURE 19 is a front perspective view of an embodiment of the prosthetic device incorporating a further securing means;

FIGURE 20 is a rear perspective view of the prosthetic device shown in FIGURE 19;

FIGURE 21 is a front elevation view of an embodiment of the prosthetic device incorporating a further securing means;

FIGURE 22 is a plan view in cross-section along line 22—22 of FIGURE 21;

FIGURE 23 is a side elevation in cross-section along line 23—23 of FIGURE 21;

FIGURE 24 is a perspective view from above of a further embodiment of a prosthetic device having a modified shape;

FIGURE 25 is a side elevation in full cross-section of the prosthetic device shown in FIGURE 24;

FIGURE 26 is a plan view of a further embodiment of a prosthetic device having a modified shape;

FIGURE 27 is a cross-section view along line 27—27 of FIGURE 26;

FIGURE 28 is a full cross-sesction view of a further embodiment of a modified prosthetic device, and FIGURE 29 is a full cross-section view of a further embodiment of a modified prosthetic device.

Figure 1:
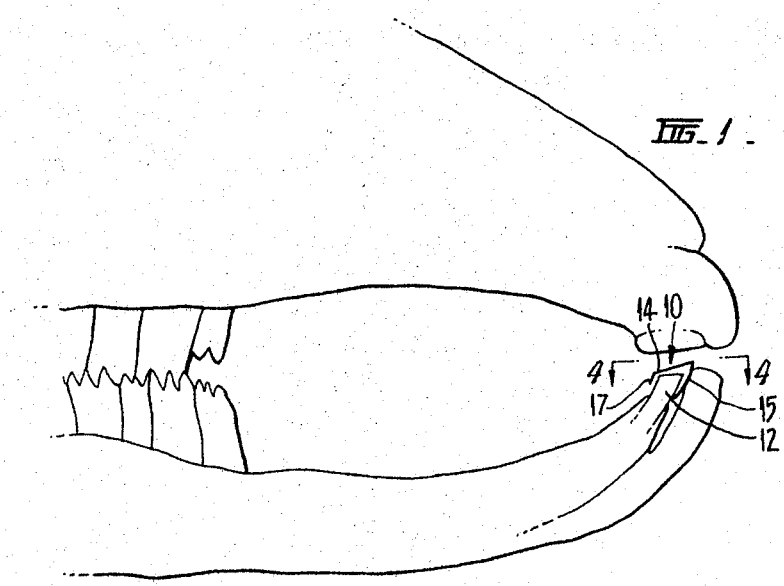
FIGURE 1 is a side elevation in cross-section view of the jaws of a sheep and an embodiment of a prosthetic device according to the invention.
Figure 2:
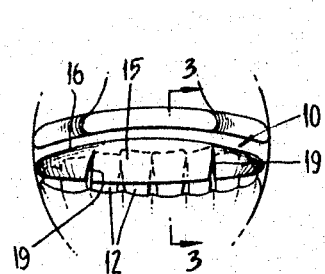
FIGURE 2 is a front elevation view of the jaws and the prosthetic device shown in FIGURE 1.
Figure 3:
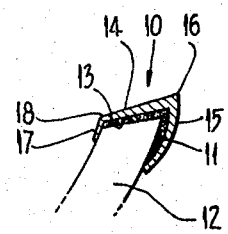
FIGURE 3 is an enlarged side elevation in cross-section view along the line 3—3 of FIGURE 2.

Referring to the drawings, an embodiment of the prosthetic device shown in FIGURES 1 to 5 consists of a curved member 10 formed of a hard corrosive resisting metal such as brass.

The member 10 is of sufficient length to extend across the incisor teeth 12 of the animal, this being in the case illustrated, a sheep.

The member 10 is provided in the form of a crescent having an underside cavity 13 extending through the member, beneath an inwardly curved biting surface 14. The surface 14 meets an outwardly curved frontal surface 15 at an acute angle to form ridge 16. A lip 17 is provided along the rear edge 18 of surface 14 to assist in locating and securing the member on the teeth.

Figure 4:
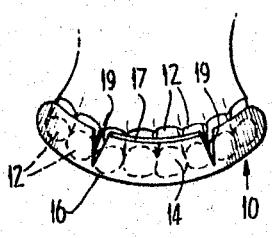
FIGURE 4 is a plan view along the line 4—4 of FIGURE 1.
Figure 5:
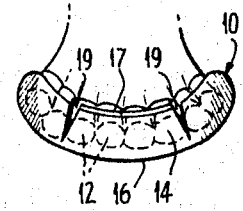
FIGURE 5 is a further plan view similar to that of FIGURE 4.

A pair of slits 19 extend partly through the member from the rear edge 18 along the radius of the curve. The slits may be expanded as shown in FIGURE 4 or contracted as shown in FIGURE 5 in order to assist in fitting the member to different sizes and curvatures of jaw bones and teeth.

The member 10 is initially secured to the teeth by mechanical friction or tension, which in the simplest form, is obtained by bending the member for a close fit to the teeth. A hard setting adhesive cement 11 is placed between the surface of cavity 13 of the member 10 and the teeth 12 so as to fill the gaps created by normal teeth spacing, and by broken and missing teeth.

It has been found in practice that a high degree of friction and tension may be required in order to initially secure the member before the cement has set hard. Modified and more efficient forms of mechanical securing means will be further described below.

The prosthetic device thus provides a clean new biting surface 14 which by reason of being fixed to several teeth, acts to evenly distribute pressure. Broken teeth will resume a useful role in bearing pressure. Deterioration of worn, loose, or weakened teeth, or the remainder teeth where teeth are missing, is arrested, and consolidation of such teeth can then take place.

In the case of sheep, the gripping action on grass held between the lower teeth and the gum pad on the upper jaw is restored, and the provision of a new edge in place of the missing, worn, or broken teeth will restore the action of tearing grass so that the animal can feed effectively.

The filling of gaps and crevices left by missing and broken teeth will prevent ingress of infection.

Referring to FIGURES 6, 7, 8 and 9, the member 20 of the prosthetic device is basically similar in shape to that described with reference to FIGURES 1 to 5, and is provided with tensioning wires 21 and 21' which wrap around teeth 12. The wires 21 and 21' are anchored at points 24 and 24' on the rear of member 20 and are terminated on pins 26 and 26' at a central lower lug 25 on the member after passing through apertures 28 and 28' in the lug 25.

The pins 26 and 26' are rotatable on their longitudinal axis by keys 27 and 27' so that the wires are drawn tight on the pins, and hold member 20 securely on teeth 12.

The wires 21 tnd 21' also assist in binding the teeth together where any loose teeth exist. In order to prevent the teeth from collapsing towards the center under the pressure of the wires 21 and 21' projections 22, 22' and 22" are provided on the inner cavity 23 of member 20, against which the teeth may bear.

The pins 26 and 26' are recessed in lug 25 in order to avoid injury to the animal's mouth which might occur through abrasion on the projecting pins and wire.

Cement 11 is applied as described above.

Referring to FIGURE 10, the member 30 of the prosthetic device is similar to the member 20 described with reference to FIGURES 6 to 9 and the same parts are indicated by the same reference numerals. The device is modified so that tension is applied to wires 21 and 21' by rotating a single pin 26 with the aid of key 27.

Referring to FIGURE 11, the member 40 of the prosthetic device is provided with wires 21 and 21' as described above to tension the device on teeth 12.

The wires 21 and 21' terminate at slot 41 which is tapered at ends 42 and 42' to enable the wires to be wedged firmly after being manually drawn tight through the aperture.

Referring to FIGURES 12 and 13, the member 50 of the prosthetic device is basically similar in shape to that described with reference to FIGURES 1 to 5.

The mechanical securing means comprises split pins 51 extending from apertures 52 in frontal surface 55 across cavity 54 to apertures 53 in rear lips 57. The open ends of split pins 51 are turned outwardly in recesses 58 in the rear surface of lip 57. Alternatively, the split pins 51 may be threaded screws engaging in threaded apertures 53.

Referring to FIGURES 14, 15 and 16 the member 60 of the prosthetic device is basically similar in shape to that described with reference to FIGURES 1 to 5.

The frontal surface 65 of member 60 is formed with depending lugs 66. Clamping bar 67 extends over lugs 66 and is tensioned on to the lugs 66 by nut 68 on flat headed screw 62 which screw projects through aperture 63 from surface 64 of member 60.

The clamping bar 67 is formed with grooves 69 which press on lugs 66 and deform the lugs into close engagement with the underlying teeth.

Referring to FIGURES 17 and 18, the member 70 is again basically of the same shape as described above.

Clamping bar 77 is located within member 70 and extends over a slotted deformable leaf 76 which is attached to member 70 and engages with several teeth. The clamping bar 77 presses the leaf 76 against the teeth under the pressure of screw 72 carried in threaded aperture 73 and thus clamps the assembly including member 70 to the teeth.

Referring to FIGURES 19 and 20, the member 80 is again basically of the same shape as described above. Lugs 86 depend from the surface 84 of member 80. Screw 82 engages lugs 86 by means of head 87 and extends through aperture 83 in frontal surface 85 to be tightened by nut 88.

Referring to FIGURES 21, 22 and 23, the member 90 is again basically of the same shape as described above.

Claws 96 depend from the periphery of the cavity 93 and are deformable to bend inwardly on teeth 12 and so hold the member 90 securely on the teeth until cement 11 sets hard.

Referring to FIGURES 24 to 25, the member 100 is of arcuate shape having a slightly concave undersurface 103. Pins or screws 102 extend from the upper surface 104 between adjacent teeth 12 to a plate member or nut 108 engaging on the front surfaces of the teeth 12 and thereby tensioning the assembly on the teeth.

Referring to FIGURES 26 and 27, the member 110 is a curved band extending around the front surfaces of teeth 12 and having a top edge 114 projecting slightly above the height of the teeth 12. Pins or screws 112 extend from the member 110 between adjacent teeth to a further band or strip 118 engaging the teeth 12 from the rear and thereby tensioning the members 110 and 118 on the teeth.

Referring to FIGURE 28, the member 120 is of the same shape as described with reference to FIGURES 1 to 5, but is formed of hard plastic material. The edge 126 and biting surface 124 is capped with a metal strip 125 in order to reduce the effects of wear on the biting surface.

Referring to FIGURE 29, the member 130 is formed and secured in position by utilizing a removable mould 135 whereby a hard setting plastic material is conveyed to the teeth and set in position after which the mould 135 is removed.

Although the invention is particularly suitable for application to the teeth of sheep where the incisor teeth are not opposed as has been described above, it will be understood that the invention also can be usefully applied to other animals such as cattle, where the incisor teeth are opposed. In such a case, the prosthetic device according to the invention can be fitted to either the upper or the lower or to both upper and lower sets of teeth.

I claim:

1. A prosthetic device for animal teeth comprising at least one curved member extending over a distance corresponding to a plurality of teeth, said member having an outer biting surface and a longitudinal cavity extending beneath the outer biting surface for engagement with and over a plurality of said teeth for fixture thereto, said member being in the shape of a crescent having an inwardly curved upper surface and an outwardly curved frontal surface, said curved surfaces meeting at an acute angle to provide a ridge along said biting surface, said member having at least one slit provided therein extending in a direction substantially along the radius of the curve from an edge of the member to enable the curvature of the member to be varied and thereby effect a closer fitting of the member to the teeth, and a settable adhesive in said cavity for filling gaps formed by broken and missing teeth and by normal teeth spacing.

2. A prosthetic device as claimed in claim 1, comprising securing means for holding said member on the teeth while said adhesive is setting.

3. A prosthetic device as claimed in claim 1, comprising securing means comprising a pair of tensioning wires each anchored on said member and drawn about at least one respective tooth to tension said member on said teeth, wherein tensioning is effected from a central lower front part of the member where an end of each of the tensioning wires is terminated, the other ends of the wires being respectively anchored at least at one point on the rear part of the member.

4. A prosthetic device as claimed in claim 1, comprising securing means comprising a pair of tensioning wires anchored on said member and drawn about at least one respective tooth to tension said member on said teeth, wherein tensioning is effected by drawing an end of each of the wires through a further slot located at the central lower front part of said member, said further slot being tapered at its ends for wedging the wires in said ends, the other ends of the wires being respectively anchored at least at one point on the rear part of the member.

5. A prosthetic device as claimed in claim 1, comprising securing means comprising a pair of tensioning wires anchored on said member and drawn about at least one of the teeth to tension said member on said teeth, wherein an end of each wire is drawn through a respective aperture located at the central lower front part of said member and is wrapped around a pin, the tension being applied by rotating the pin on its axis normal to the apertures, so that each wire is drawn tight by the pin, the other ends of the wires being respectively anchored at least at one point on the rear part of the member.

6. A prosthetic device as claimed in claim 1, comprising securing means comprising a deformable leaf part extending over the teeth and under the underside surface of the frontal part of the member, a clamping bar extending over the leaf part, and a threaded screw engaging in a threaded aperture in the frontal part and bearing against the clamping bar whereby tension is applied to the bar against the deformable leaf to clamp the assembly on the teeth.

7. A prosthetic device as claimed in claim 1, comprising lineal tensioning means passing from said member between adjacent teeth to a further part of the device which is tensioned against the teeth on the opposite side thereof from said member.

8. A proshetic device as claimed in claim 1, comprising securing means comprising a plurality of deformable claws depending from the periphery of said member adjacent said hollow surface.

9. A prosthetic device as claimed in claim 1, wherein said member is constituted at least partly by a hard setting plastic material.

References Cited

UNITED STATES PATENTS

| | | | |
|---|---|---|---|
| 3,046,657 | 7/1962 | Menter et al. | 32—12 |
| 3,055,109 | 9/1962 | Newcomb | 32—12 |
| 3,120,704 | 2/1964 | Newcomb | 32—12 |
| 3,140,543 | 7/1964 | Menter | 32—12 |

ROBERT PESHOCK, Primary Examiner